United States Patent Office 2,827,451
Patented Mar. 18, 1958

2,827,451

2-AMINOTHIOPHENE AZO COMPOUNDS

Edmund B. Towne, William H. Moore, and Joseph B. Dickey, Kingsport, Tenn., assignors to Eastman Kodak Company, Rochester, N. Y., a corporation of New Jersey No Drawing. Application August 12, 1955
Serial No. 528,133

12 Claims. (Cl. 260—154)

This invention relates to new 2-aminothiophene azo compounds, to the application of the new azo compounds to the art of dyeing or coloring and to materials colored with the new azo compounds of the invention.

We have discovered that the new monoazo compounds having the formula:

(I) 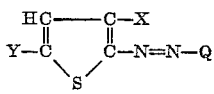

wherein X represents a nitro group or an alkylsulfonyl group having 1 to 4, inclusive, carbon atoms, Y represents an alkyl-sulfonyl group having 1 to 4, inclusive, carbon atoms or a sulfonealkylamido group having 1 to 4, inclusive, carbon atoms and Q represents the radical of a 5-pyrazolone compound joined to the azo bond shown through the carbon atom in its 4-position, the radical of barbituric acid, the radical of 2-iminobarbituric acid, the radical of 4-iminobarbituric acid, the radical of 2-imino-3-cyanobarbituric acid, the radical of thiobarbituric acid or the radical of 4-iminothiobarbituric acid are useful for coloring a considerable number of different textile materials. They are useful, for example, for coloring textile materials made of or containing a cellulose alkyl carboxylic acid ester having 2 to 4 carbon atoms in the acid groups thereof, sulfone polyester textile materials, nylon textile materials, wool, polyethylene terephthalate (Dacron) textile materials and polyacrylonitrile, especially acrylonitrile graft polymer, textile materials.

Ordinarily the azo compounds of our invention are applied by known dyeing techniques to fabrics or fibers made of the aforesaid textile materials. However, coloration can also be effected, for example, by incorporating the azo compounds into the spinning dope in accordance with known techniques and spinning the fiber as usual. The azo compounds of our invention have varying utility as dyes. The degree of utility varies, for example, depending upon the material being colored and the formula of the azo compound.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new monoazo compounds of our invention are prepared by diazotizing a 2-aminothiophene compound having the formula:

(II) 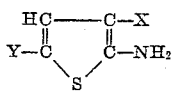

wherein X represents a nitro group or an alkylsulfonyl group having 1 to 4, inclusive, carbon atoms and Y represents an alkylsulfonyl group having 1 to 4, inclusive, carbon atoms or a sulfonalkylamido group having 1 to 4, inclusive, carbon atoms and coupling the diazonium compound obtained with a 5-pyrazolone compound, barbituric acid, 2-iminobarbituric acid, 4-iminobarbituric acid, 2-imino-3-cyanobarbituric acid, thiobarbituric acid and 4-iminothiobarbituric acid.

The monoazo compounds of our invention yield yellow, orange and orange-red shades on the textile materials indicated hereinbefore which have good fastness to light, washing and sublimation, excellent gas fastness and which discharge to a pure white.

While our invention relates broadly to the new monoazo compounds having the formula numbered I insofar as those azo compounds which contain a 5-pyrazolone nucleus are concerned, it relates more particularly to the thiophene azo pyrazolone compounds having the formula:

(III) 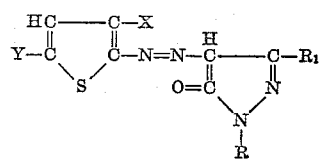

wherein R represents a hydrogen atom or a phenyl radical, $R_1$ represents a methyl group, a carboxyl group, a carbomethoxy group, a carboethoxy group, a phenyl group or a trifluoromethyl group and X and Y have the meaning previously assigned to them.

The 2-aminothiophene compounds used in the preparation of the new azo compounds of our invention are new compounds. They are described and claimed in our copending application Serial No. 528,132, filed August 12, 1955.

2 - amino - 3,5 - bis(methylsulfonyl) - thiophene, 2 - amino - 3,5 - bis(ethylsulfonyl) - thiophene, 2 - amino-3,5-bis(n-propylsulfonyl)-thiophene, 2-amino-3,5-bis(isopropylsulfonyl) - thiophene, 2 - amino - 3,5 - bis(n-butylsulfonyl) - thiophene, 2 - amino - 3 - nitro - 5-methylsulfonylthiophene, 2-amino-3-nitro-5-ethylsulfonylthiophene, 2-amino-3-nitro-5-n-propylsulfonylthiophene, 2 - amino - 3 - nitro - 5 - n - butysulfonylthiophene, 2 - amino - 3 - nitro - 5 - sulfonemethylamidothiophene, 2-amino-3-nitro-5-sulfonethylamidothiophene, 2-amino-3-nitro-5-sulfone-n-propylamidothiophene and 2-amino-3-nitro-5-sulfone-n-butylamidothiophene are illustrative of the 2-aminothiophene compounds used in the preparation of the azo compounds of our invention.

3-methyl-5-pyrazolone, 3-carboxy-5-pyrazolone, 3-carbomethoxy-5-pyrazolone, 3-carboethoxy-5-pyrazolone, 3-amino-5-pyrazolone, 3-hydroxy-5-pyrazolone, 3-trifluoromethyl-5-pyrazolone, 1-phenyl-3-methyl-5-pyrazolone, 1-phenyl-3-amino-5-pyrazolone, 1-phenyl-3-hydroxy-5-pyrazolone, 1-phenyl-3-methyl-5-p-nitrophenyl pyrazolone, 3-phenyl-5-pyrazolone, 1-phenyl-3-carbomethoxy-5-pyrazolone, 1-phenyl-3-carboethoxy-5-pyrazolone, 1-p-nitrophenyl-3-methyl-5-pyrazolone, 1-o-nitrophenyl-3-methyl-5-pyrazolone, 1-p-methylphenyl-3-methyl-5-pyrazolone, 1-p - methoxyphenyl - 3 - amino - 5 - pyrazolone, 1 - p-methylphenyl-3-amino-5-pyrazolone, 1-o-chloro-phenyl-3-amino-5-pyrazolone, 1-p-chlorophenyl-3-amino-5-pyrazolone,1-p-ethylphenyl-3-methyl-5-pyrazolone and 1-p-chlorophenyl-3-methyl-5-pyrazolone, for example, are illustrative of the pyrazolone compounds used in the preparation of the azo compounds of our invention.

The monoazo compounds of our invention are dyes for fibers prepared from graft polymers obtained by graft polymerizing acrylonitrile alone or together with one or more other monoethylenic monomers with a preformed polymer. The preformed polymer can be a homopolymer (a polymer prepared by polymerization of a single monomer) or it can be an interpolymer such as a copolymer (a polymer prepared by the simultaneous polymerization in a single reaction mixture of two monomers) or a terpolymer (a polymer prepared by the simultaneous polymerization in a single reaction mixture of three monomers), or the like, and the graft polymers for which the dyes are particularly useful are those containing at least 5% by weight of combined acrylonitrile grafted to the preformed polymer molecule.

The graft polymers which can be dyed are thus polymers having directed placement of the polymerized monomeric units in the graft polymer molecule as distinguished from the random distribution obtained in interpolymers which are prepared by simultaneous polymerization of all of the monomeric materials in the polymer. The preformed polymer can be either a homopolymer of any of the well-known polymerizable monomers containing a single —CH=C< group and desirably a $CH_2$=C< group, or an interpolymer of two or more of such monomers; and the grafting can be effected with the preformed homopolymer or interpolymer in the polymerization mixture in which it was formed (i. e. a live polymer) or with the preformed polymer isolated from the polymerization mixture in which it was formed (i. e. a dead polymer).

The preformed polymer desirably is a homopolymer of a vinyl pyridine, an acrylamide, a maleamide, a fumaramide, an acrylate, a methacrylamide, a methacrylate, an itaconamide, a citraconamide, a fumaramate, an itaconamate, a citracontamate, a maleamate, or a vinyl ester; or an interpolymer of two or more of such monomers with each other or of at least one of such monomers with one or more different monoethylenic monomers characterized by a —CH=C< group such as styrene, acrylonitrile, substituted styrenes, vinyl or vinylidene chlorides, vinyl ethers, dialkyl maleates, alkenyl ketones, dialkyl fumarates, acrylic acid, methacrylic acid, substituted acrylonitriles, fumaronitrile, ethylene and the like.

The graft polymerization is effected by polymerizing acrylonitrile or a mixture of acrylonitrile with any other monoethylenic monomer, including any of the monomers enumerated hereinabove, with the preformed live or dead homopolymer or interpolymer whereby the acrylonitrile alone or together with another grafting monomer is combined with the preformed polymer molecule to give a graft polymer containing from 5 to 95% by weight of combined acrylonitrile.

Insofar as graft polymers are concerned, the new azo compounds of our invention are of particular utility for dyeing fibers prepared from a graft polymer obtained by graft polymerizing acrylonitrile and an acrylamide or methacrylamide with a preformed copolymer of acrylonitrile and the same or different acrylamide or methacrylamide.

U. S. Patent 2,620,324, issued December 2, 1952, U. S. Patent 2,649,434, issued August 18, 1953, and U. S. Patent 2,657,191, issued October 27, 1953, disclose other typical graft polymers that can be dyed with the new azo compounds of our invention.

Sulfone polyester textile materials that can be colored with the new azo compounds of our invention are disclosed in U. S. Patent 2,614,120, issued October 14, 1952. Additional sulfone polyester textile materials that can be colored with our new azo compounds are disclosed and claimed in copending Caldwell U. S. application Serial No. 313,061, filed October 3, 1952, now Patent No. 2,744,089. An acrylonitrile graft polymer textile material and a sulfone polyester textile material upon which the azo dyes have been applied are specifically described hereinafter.

The following examples illustrate the compounds of our invention and their manner of preparation.

EXAMPLE 1

6.76 grams of 2-acetamido-3,5-bis(chlorosulfonyl)-thiophene (JACS, 73, 615 [1951]) and 5.8 grams of sodium sulfite were stirred together in 20 cc. of water while 25% aqueous sodium hydroxide was added at such a rate as to maintain a pH of 8–9. The temperature of the reaction mixture was maintained below 30° C. by means of an ice bath. After about 1 hour the reaction slowed and the reaction mixture was then gradually heated to 70° C. while maintaining a pH of 8–9 by addition of 25% aqueous sodium hydroxide as needed. When the reaction mixture, containing the disodium salt of 2-acetamido-3,5-thiophenedisulfinic acid, reached the point that it could be stirred at 70° C. for 15 minutes with no change in pH, it was neutralized with chloroacetic acid after which 0.5 gram of potassium iodide were added and the reaction mixture heated to reflux. A neutral solution of 10.25 grams of sodium chloroacetate in 20 cc. of water was added and the reaction mixture refluxed for 6 hours. The reaction mixture was then cooled and the 2-acetamido-3,5-bis(methylsulfonyl)-thiophene which separated as a solid was collected on a filter and washed well with cold water. 2.64 grams of 2-acetamido-3,5-bis(methylsulfonyl)-thiophene having a melting point of 228° C.–230° C. were thus obtained.

The 2-acetamido-3,5-bis(methylsulfonyl)-thiophene obtained as described above was refluxed in 100 cc. of 4 N hydrochloric acid until solution was effected and then refluxing was continued for an additional half hour. The reaction mixture was filtered while hot and the filtrate was chilled in an ice bath. The tan colored crystals of 2-amino-3,5-bis(methylsulfonyl)-thiophene which precipitated were collected on a filter and washed with water until neutral. A yield of 1.55 grams was obtained. After recrystallization from water, the 2-amino-3,5-bis-(methylsulfonyl)-thiophene melted at 201.4° C.

EXAMPLE 2

5.02 grams of an alkaline solution (pH 8–9) of the disodium salt of 2-acetamido-3,5-thiophenedisulfinic acid, prepared according to the procedure described in Example 1, was heated at reflux for 12 hours with 31 grams of ethyl iodide and sufficient ethyl alcohol to render the hot solution homogeneous. Upon completion of the refluxing the excess ethyl iodide and ethyl alcohol were distilled off and the 2-acetamido-3,5-bis(ethylsulfonyl)-thiophene which formed was recovered from the reaction mixture by extraction with ethyl ether. The ethyl ether extract was dried over anhydrous sodium sulfate and the ethyl ether evaporated.

The 2-acetamido-3,5-bis(ethylsulfonyl)-thiophene prepared as described above was hydrolyzed with 4 N hydrochloric acid in accordance with the procedure described in Example 1 to obtain 2 grams of 2-amino-3,5-bis(ethylsulfonyl)-thiophene.

EXAMPLE 3

By the use of 34 grams of n-propyl iodide in place of ethyl iodide in Example 2, 2-amino-3,5-bis(n-propylsulfonyl)-thiophene is obtained.

EXAMPLE 4

2-amino-3,5-bis(n-butylsulfonyl)-thiophene was prepared in accordance with the procedure described in Example 2 except that 36.8 grams of n-butyl iodide was used in place of ethyl iodide and the reaction mixture was heated at reflux for 18 hours instead of 12 hours. A yield of 2.8 grams was obtained.

EXAMPLE 5

21.7 grams of 5-chlorosulfonyl-2-chlorothiophene (Annalen, 532, 264 [1937]) and 13.9 grams of sodium sulfite were stirred together in 100 cc. of water while 25% aqueous sodium hydroxide was added at such a rate as to maintain a pH of 8–9. The temperature of the reaction mixture was kept under 30° C. by means of an ice bath. After about 1 hour, the reaction slowed and the reaction mixture was then gradually heated to 70° C. while maintaining a pH of 8–9 by addition of 25% aqueous sodium hydroxide as needed. When the reaction mixture, containing the sodium salt of 2-chlorothiophene-5-sulfinic acid, reaches the point that it can be stirred at 70° C. for 15 minutes with no change in pH, it was neutralized with chloroacetic acid (approximately 0.6 gram) and 2 grams of potassium iodide were added. The reaction mixture was then heated to reflux and a solution of 13.1 grams of sodium chloroacetate and 2.64 grams of chloroacetic acid in 50 cc. of water was added dropwise over a period of 3 hours. After this addition was completed, refluxing was continued for 4 hours longer. The reaction mixture was allowed to cool following which the 2-chloro-5-methylsulfonylthiophene formed in the reaction was extracted with ethyl ether. The ethyl ether extract was dried over anhydrous calcium sulfate (e. g. Drierite, an anhydrous calcium sulfate having a highly porous granular structure and a high affinity for water) and the ether evaporated. Upon recrystallization from cyclohexane 12 grams of 2-chloro-5-methylsulfonylthiophene having a melting point of 72° C.–75° C. were obtained.

58.95 grams of 2-chloro-5-methylsulfonylthiophene were added portionwise over a period of 1 and ½ hours to an ice-cooled mixture of concentrated sulfuric acid (specific gravity 1.84, 96%) and fuming nitric acid (specific gravity 1.5, 90%). About half way through the addition a white solid began to separate from the reaction mixture. After the addition of the 2-chloro-5-methylsulfonylthiophene was completed, the reaction mixture was stirred at ice bath temperature for 1 and ½ hours, then drowned in ice, filtered and the product recovered on the filter was washed with cool water until neutral. Upon recrystallizing the product from ethyl alcohol 68.4 grams of 2-chloro-3-nitro-5-methylsulfonylthiophene melting at 150° C.–152° C. were obtained.

24.15 grams of 2 - chloro - 3 - nitro - 5 - methylsulfonylthiophene were dissolved in 750 cc. of absolute ethyl alcohol. The solution thus obtained was stirred at 70° C. while anhydrous ammonia was bubbled in for 2 hours at 70° C. The reaction mixture was concentrated to approximately one-third its volume and cooled. The red solid product which precipitated was recovered by filtration and recrystallized from water containing charcoal to obtain 9.5 grams of 2-amino-3-nitro-5-methylsulfonylthiophene melting at 187° C.–189° C.

EXAMPLE 6

By the use of 34 grams of isopropyl iodide in place of ethyl iodide in Example 2,2-amino-3,5-bis(isopropylsulfonyl)thiophene is obtained.

EXAMPLE 7

An alkaline, aqueous ethyl alcohol solution (pH 8–9) of 20.5 grams of the sodium salt of 2-chlorothiophene-5-sulfinic acid prepared as described in the first part of Example 5 was heated at reflux for 12 hours with 83 grams of ethyl iodide. The excess ethyl iodide and ethyl alcohol were distilled off and the 2-chloro-5-ethylsulfonylthiophene formed by the reaction was separated from the reaction mixture by extraction with ethyl ether. The ethyl ether extract was dried and the ethyl ether distilled off to yield 12.7 grams of 2-chloro-5-ethylsulfonylthiophene.

The 12.7 grams of 2-chloro-5-ethylsulfonylthiophene prepared as described above were nitrated by adding it portionwise over a period of 1 and ½ hours to a mixture of 15 grams of concentrated 96% sulfuric acid and 5.2 grams of 90% nitric acid, cooled in an ice bath. After addition of the 2-chloro-5-ethylsulfonylthiophene was complete, stirring was continued for 1 and ½ hours and then the reaction mixture was drowned on ice, filtered, and the product recovered on the filter was washed well with water and dried. 13.5 grams of 2-chloro-3-nitro-5-ethylsulfonylthiophene were recovered as a white crystalline solid.

The 13.5 grams of 2-chloro-3-nitro-5-ethylsulfonylthiophene prepared as described above were dissolved in 400 cc. of absolute ethyl alcohol and aminated by bubbling anhydrous ammonia into the reaction mixture for 2 hours while maintaining the reaction mixture at 70° C. and stirring. Then the reaction mixture was concentrated to one-third its volume and cooled. A reddish solid precipitated and was recovered by filtration. The reddish solid was recrystallized from water to obtain 6.4 grams of 2-amino-3-nitro-5-ethylsulfonylthiophene.

EXAMPLE 8

By the use of 85 grams of n-propyl iodide in place of ethyl iodide in Example 7, 2-amino-3-nitro-5-n-propylsulfonylthiophene is obtained.

EXAMPLE 9

By the use of 92 grams of n-butyl iodide in place of ethyl iodide in Example 7, 2-amino-3-nitro-5-n-butylsulfonylthiophene is obtained.

EXAMPLE 10

24.8 grams of 2 - chloro - 3 - nitro-5-chlorosulfonylthiophene (JCS, 1948, page 25) were dissolved in 60 cc. of acetone and the solution resulting was stirred at 0°C.–5°C. while 36 grams of a 33% aqueous solution of ethylamine were added over a period of about 1 and ½ hours. After stirring for an additional half hour at 0° C., the reaction mixture was poured into 400 cc. of ice water. On standing, the oil which separated became solid. 17.8 grams of crude 2-chloro-3-nitro-5-sulfonethylamidothiophene were thus obtained by recovery of the solid from the ice water. Upon recrystallization from aqueous ethyl alcohol a purified product melting at 70° C.–73° C. was obtained.

4 grams of purified 2-chloro-3-nitro-5-sulfonethylamidothiophene obtained as described above was refluxed for 1 hour with 14 cc. of concentrated aqueous ammonium hydroxide in 50 cc. of ethyl alcohol. After refluxing was complete, the reaction mixture was concentrated to one-third its volume and the ammonium chloride which precipitated was removed by filtration. Upon evaporation of the remaining solution to dryness 3.1 grams of 2-amino-3-nitro-5-sulfonethylamidothiophene were obtained as an oil which solidified on standing.

EXAMPLE 11

By the use of an equivalent amount of methylamine, n-propylamine and n-butylamine, respectively, for ethylamine in Example 10, 2-amino-3-nitro-5-sulfonemethylamidothiophene, 2 - amino - 3-nitro-5-sulfone-n-propylamidothiophene and 2-amino-3-nitro-5-sulfone-n-butylamidothiophene, respectively, are obtained.

EXAMPLE 12

Nitrosylsulfuric acid was prepared by adding 1.52 grams of sodium nitrite portionwise to 10 cc. of concentrated sulfuric acid, with stirring, and allowing the temperature to rise to 65° C. The solution thus obtained was then cooled to 5° C. and a mixture consisting of 3 cc. of propionic and 17 cc. of acetic acid was added dropwise, with stirring, while allowing the temperature to rise to 15° C. and then keeping it there during the addition of the acid mixture. The reaction mixture thus obtained was then cooled to 0° C.–5° C. and 5.61 grams of 2-amino-3,5-bis-(methylsulfonyl)-thiophene were added portionwise while stirring, after which a mixture of 3 cc. of propionic acid and 17 cc. of acetic acid was added while keeping the temperature of the reaction mixture at 0° C.–5° C. The reaction mixture was then stirred at 0° C.–5° C. for 2 hours and the excess sodium nitrite present was destroyed by adding 1 gram of urea. A clear diazonium solution of 2-amino-3,5-bis(methylsulfonyl)-thiophene was obtained by the foregoing precedure.

10 cc. of the diazonium solution prepared as described in the preceding paragraph were added with stirring to a solution of 0.58 gram of thiobarbituric acid in about 10 cc. of an acetic-propionic acid mixture prepared as described in the preceding paragraph. The coupling reaction which takes place was allowed to proceed for 1 hour after which the reaction mixture was neutralized with sodium carbonate and drowned in water. The precipitated dye compound was recovered by filtration, washed well with water and dried. 1.1 grams of the dye compound having the formula:

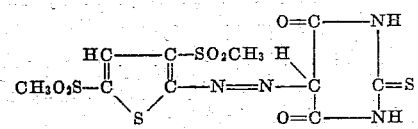

were thus obtained. It dyes the textile materials named hereinbefore such as cellulose acetate, nylon, wool, sulfone polyester, polyethylene terephthalate and acrylonitrile graft polymer textile materials, for example, yellow shades having good fastness to gas. The dyeing on cellulose acetate has fair light fastness.

EXAMPLE 13

By the use of 0.64 gram of 3-phenyl-5-pyrazolone in place of thiobarbituric acid in Example 12, 1.35 grams of a dye compound which colored cellulose acetate textile materials yellow shades were obtained.

EXAMPLE 14

4.44 grams of 2-amino-3-nitro-5-methylsulfonylthiophene were diazotized with nitrosylsulfuric acid in acetic-propionic acid in accordance with the procedure described in Example 12 for the diazotization of 2-amino-3,5-bis-(methylsulfonyl)-thiophene. A clear diazonium solution was obtained.

10 cc. of the diazonium solution prepared in the preceding paragraph were added to a solution of 0.51 gram of 3-carboxy-5-pyrazolone dissolved in dilute aqueous sodium hydroxide and cooled to 0° C. The coupling reaction which takes place was allowed to proceed for about 1 hour and then the reaction mixture was drowned in 200 cc. of water with stirring. After the drowned reaction mixture had stood for about 1 hour, the dye compound which precipitated was recovered by filtration, washed with water until neutral and dried. 1.07 grams of a dye which colors cellulose acetate, wool, nylon, Dacron and acrylonitrile graft polymer textile materials orange-red shades having good fastness to gas were thus obtained.

EXAMPLE 15

10 cc. of the diazonium solution prepared as described in Example 14 were coupled with 0.52 gram of barbituric acid. Coupling and recovery of the dye compound formed were carried out in accordance with the general procedure described in Example 12. The dye compound obtained colors the textile materials disclosed herein orange shades.

EXAMPLE 16

5.02 grams of 2-amino-3-nitro-5-sulfonethylamidothiophene were diazotized with nitrosylsulfuric acid in acetic-propionic acid in accordance with the procedure described in Example 12 for the diazotization of 2-amino-3,5-bis-(methylsulfonyl)-thiophene. A clear diazonium solution was obtained.

10 cc. of the diazonium solution prepared as described in the preceding paragraph were coupled with 0.7 gram of 1-phenyl-3-methyl-5-pyrazoline. Coupling and recovery of the dye compound formed were carried out in accordance with the general precedure described in Example 12. The dye compound obtained colors the textile materials disclosed herein yellow shades.

EXAMPLE 17

10 cc. of the diazonium solution prepared as described in Example 12 were coupled with 0.52 gram of barbituric acid. Coupling and recovery of the dye compound formed were carried out in accordance with the general procedure described in Example 12. The dye compound obtained colors the textile materials disclosed herein yellow shades.

EXAMPLE 18

10 cc. of the diazonium solution prepared as described in Example 12 were coupled with 0.51 gram of 2-iminobarbituric acid. Coupling and recovery of the dye compound formed were carried out in accordance with the general procedure described in Example 12. The dye compound obtained colors the textile materials disclosed herein yellow shades.

EXAMPLE 19

10 cc. of the diazonium solution prepared as described in Example 12 were coupled with 0.63 gram of 4-iminothiobarbituric acid. Coupling and recovery of the dye compound formed were carried out in accordance with the general procedure described in Example 12. The dye compound obtained colors the textile materials disclosed herein yellow shades.

EXAMPLE 20

10 cc. of the diazonium solution prepared as described in Example 12 were coupled with 0.61 gram of 2-imino-3-cyanobarbituric acid. Coupling and recovery of the dye compound formed were carried out in accordance with the general procedure described in Example 12. The dye compound obtained colors the textile materials disclosed herein yellow shades.

EXAMPLE 21

10 cc. of the diazonium solution prepared as described in Example 12 were coupled with 0.4 gram of 3-amino-5-pyrazolone. Coupling and recovery of the dye compound formed were carried out in accordance with the general procedure described in Example 12. The dye compound obtained colors the textile materials disclosed herein yellow shades.

EXAMPLE 22

10 cc. of the diazonium compound prepared as described in Example 12 were coupled with 0.76 gram of 1-phenyl-3-amino-5-pyrazolone. Coupling and recovery of the dye compound formed were carried out in accordance with the general procedure described in Example 12. The dye compound obtained colors the textile materials disclosed herein yellow shades.

EXAMPLE 23

5.66 grams of 2-amino-3,5-bis(ethylsulfonyl)-thiophene were diazotized with nitrosylsulfuric acid in acetic-propionic acid in accordance with the procedure described in Example 12 for the diazotization of 2-amino-3,5-bis(methylsulfonyl)-thiophene. A clear diazonium solution was obtained.

10 cc. of the diazonium solution prepared as described in the preceding paragraph were coupled with 0.58 gram of thiobarbituric acid. Coupling and recovery of the dye compound formed were carried out in accordance with the general procedure described in Example 12. The dye compound obtained colors the textile materials disclosed herein yellow shades.

EXAMPLE 24

6.12 grams of 2-amino-3,5-bis(n-butylsulfonyl)-thiophene were diazotized with nitrosylsulfuric acid in acetic-propionic acid in accordance with the procedure described in Example 12 for the diazotization of 2-amino-3,5-bis(methylsulfonyl)-thiophene. A clear diazonium solution was obtained.

10 cc. of the diazonium solution prepared as described in the preceding paragraph were coupled with 0.7 gram of 1-phenyl-3-methyl-5-pyrazolone. Coupling and recovery of the dye compound formed were carried out in accordance with the general procedure described in Example 12. The dye compound obtained colors the textile materials disclosed herein yellow shades.

EXAMPLE 25

4.68 grams of 2-amino-3-nitro-5-ethylsulfonylthiophene were diazotized with nitrosylsulfuric acid in acetic-propionic acid in accordance with the procedure described in Example 12 for the diazotization of 2-amino-3,5-bis(methylsulfonyl)-thiophene. A clear diazonium solution was obtained.

10 cc. of the diazonium solution prepared as described in the preceding paragraph were coupled with 0.52 gram of barbituric acid. Coupling and recovery of the dye compound formed were carried out in accordance with the general procedure described in Example 12. The dye compound obtained colors the textile materials disclosed herein orange shades.

EXAMPLE 26

4.74 grams of 2-amino-3-nitro-5-sulfonemethylamidothiophene were diazotized with nitrosylsulfuric acid in acetic-propionic acid in accordance with the procedure described in Example 12 for the diazotization of 2-amino-3,5-bis(methylsulfonyl)-thiophene. A clear diazonium solution was obtained.

10 cc. of the diazonium solution prepared as described in the preceding paragraph were coupled with 0.51 gram of 3-carboxy-5-pyrazolone. Coupling and recovery of the dye compound formed were carried out in accordance with the general procedure described in Example 12. The dye compound obtained colors the textile materials disclosed herein orange shades.

The following tabulation further illustrates the azo compounds included within the scope of our invention together with the color they produce on cellulose acetate. The compounds indicated below are prepared by diazotizing the amines listed under the heading "Amine" and coupling the diazonium compounds obtained with the compounds specified in the column entitled "Coupling Component." The diazotization and coupling reactions may, for example, be carried out following the general procedure indicated hereinbefore. The colors these azo compounds yield on the other materials disclosed herein is generally similar to the color they produce on cellulose acetate.

| Amine | Coupling Component | Color |
|---|---|---|
| 2-amino-3,5-bis(methylsulfonyl)-thiophene | (1) 4-Iminobarbituric acid | yellow. |
| Do | (2) 3-methyl-5-pyrazolone | yellowish orange. |
| Do | (3) 3-trifluoromethyl-5-pyrazolone | Do. |
| Do | (4) 3-carboxy-5-pyrazolone | Do. |
| Do | (5) 3-carbomethoxy-5-pyrazolone | Do. |
| Do | (6) 3-carboethoxy-5-pyrazolone | Do. |
| Do | (7) 1-phenyl-3-methyl-5-pyrazolone | Do. |
| Do | (8) 1-phenyl-3-carboethoxy-5-pyrazolone | Do. |
| Do | (9) 1-phenylpyrazole-3,5-dione | Do. |
| 2-amino-3,5-bis(ethylsulfonyl)-thiophene | (1) barbituric acid | yellow. |
| Do | (2) 2-iminobarbituric acid | Do. |
| Do | (3) 4-iminobarbituric acid | Do. |
| Do | (4) 4-iminothiobarbituric acid | Do. |
| Do | (5) 2-imino-3-cyanobarbituric acid | Do. |
| Do | (6) 3-carboxy-5-pyrazolone | yellowish orange. |
| Do | (7) 3-phenyl-5-pyrazolone | Do. |
| Do | (8) 1-phenyl-3-methyl-5-pyrazolone | Do. |
| 2-amino-3,5-bis(n-propylsulfonyl)-thiophene | (1) barbituric acid | yellow. |
| Do | (2) thiobarbituric acid | Do. |
| Do | (3) 3-carboxy-5-pyrazolone | yellowish orange. |
| Do | (4) 3-phenyl-5-pyrazolone | Do. |
| Do | (5) 1-phenyl-3-methyl-5-pyrazolone | Do. |
| 2-amino-3,5-bis(isopropylsulfonyl)-thiophene | (1) barbituric acid | yellow. |
| Do | (2) thiobarbituric acid | Do. |
| Do | (3) 3-carboxy-5-pyrazolone | yellowish orange. |
| Do | (4) 3-phenyl-5-pyrazolone | Do. |
| Do | (5) 1-phenyl-3-methyl-5-pyrazolone | Do. |
| 2-amino-3,5-bis(n-butylsulfonyl)-thiophene | (1) barbituric acid | yellow. |
| Do | (2) thiobarbituric acid | Do. |
| Do | (3) 3-carboxy-5-pyrazolone | yellowish orange. |
| Do | (4) 3-phenyl-5-pyrazolone | Do. |
| Do | (5) 1-phenyl-3-methyl-5-pyrazolone | Do. |
| 2-amino-3-nitro-5-methylsulfonylthiophene | (1) thiobarbituric acid | yellow-orange. |
| Do | (2) 2-iminobarbituric acid | Do. |
| Do | (3) 4-iminobarbituric acid | Do. |
| Do | (4) 4-iminothiobarbituric acid | Do. |
| Do | (5) 2-imino-3-cyanobarbituric acid | Do. |
| Do | (6) 3-methyl-5-pyrazolone | orange-red. |
| Do | (7) 3-trifluoromethyl-5-pyrazolone | Do. |
| Do | (8) 3-carboxy-5-pyrazolone | Do. |
| Do | (9) 3-carboethoxy-5-pyrazolone | Do. |
| Do | (10) 3-phenyl-5-pyrazolone | Do. |
| Do | (11) 1-phenyl-3-methyl-5-pyrazolone | Do. |
| Do | (12) 1-phenyl-3-carboethoxy-5-pyrazolone | Do. |
| Do | (13) 1-phenylpyrazole-3,5-dione | Do. |
| 2-amino-3-nitro-5-ethyl-sulfonylthiophene | (1) thiobarbituric acid | yellow-orange. |
| Do | (2) 2-iminobarbituric acid | Do. |
| Do | (3) 3-carboxy-5-pyrazolone | orange-red. |
| Do | (4) 3-phenyl-5-pyrazolone | Do. |
| Do | (5) 1-phenyl-3-methyl-5-pyrazolone | Do. |
| 2-amino-3-nitro-5-n-propylsulfonylthiophene | (1) barbituric acid | yellow-orange. |
| Do | (2) thiobarbituric acid | Do. |
| Do | (3) 3-carboxy-5-pyrazolone | orange-red. |
| Do | (4) 3-phenyl-5-pyrazolone | Do. |
| Do | (5) 1-phenyl-3-methyl-5-pyrazolone | Do. |
| 2-amino-3-nitro-5-n-butylsulfonylthiophene | (1) barbituric acid | yellowish orange. |
| Do | (2) thiobarbituric acid | Do. |
| Do | (3) 3-carboxy-5-pyrazolone | orange-red. |
| Do | (4) 3-phenyl-5-pyrazolone | Do. |
| Do | (5) 1-phenyl-3-methyl-5-pyrazolone | Do. |

| Amine | Coupling Component | Color |
|---|---|---|
| 2-amino-3-nitro-5-sulfone-methylamidothiophene | (1) barbituric acid | yellowish orange. |
| Do | (2) thiobarbituric acid | Do. |
| Do | (3) 3-carboxy-5-pyrazolone | orange. |
| Do | (4) 3-phenyl-5-pyrazolone | orange-red. |
| Do | (5) 1-phenyl-3-methyl-5-pyrazolone | Do. |
| 2-amino-3-nitro-5-sulfonethylamidothiophene | (1) barbituric acid | yellowish orange. |
| Do | (2) thiobarbituric acid | Do. |
| Do | (3) 2-iminobarbituric acid | Do. |
| Do | (4) 4-iminobarbituric acid | Do. |
| Do | (5) 4-iminothiobarbituric acid | Do. |
| Do | (6) 2-imino-3-cyanobarbituric acid | Do. |
| Do | (7) 3-methyl-5-pyrazolone | orange-red. |
| Do | (8) 3-trifluoromethyl-5-pyrazolone | orange. |
| Do | (9) 3-carbomethoxy-5-pyrazolone | Do. |
| Do | (10) 3-carboethoxy-5-pyrazolone | Do. |
| Do | (11) 3-phenyl-5-pyrazolone | orange-red. |
| Do | (12) 1-phenyl-3-carboethoxy-5-pyrazolone | Do. |
| Do | (13) 1-phenylpyrazole-3,5-dione | Do. |
| 2-amino-3-nitro-5-sulfone-n-propylamidothiophene | (1) barbituric acid | yellowish orange. |
| Do | (2) thiobarbituric acid | Do. |
| Do | (3) 3-carboxy-5-pyrazolone | orange. |
| Do | (4) 3-phenyl-5-pyrazolone | orange-red. |
| Do | (5) 1-phenyl-3-methyl-5-pyrazolone | Do. |
| 2-amino-3-nitro-5-sulfone-n-butylamidothiophene | (1) baributric acid | yellowish orange. |
| Do | (2) thiobarbituric acid | Do. |
| Do | (3) 3-carboxy-5-pyrazolone | orange. |
| Do | (4) 3-phenyl-5-pyrazolone | orange-red. |
| Do | (5) 1-phenyl-3-methyl-5-pyrazolone | Do. |

*Preparation of acrylonitrile graft polymer*

3.0 g. of acrylonitrile and 7.0 g. of N-methyl methacrylamide were emulsified in 40 cc. of water containing 0.15 g. of potassium persulfate and 0.01 g. of tertiary dodecyl mercaptan. The emulsion was heated at 60° C. until 94% or more of the monomers had copolymerized. This result is usually accomplished by heating for about 12 hours. The copolymer contained approximately 30% by weight of acrylonitrile and 70% by weight of N-methyl methacrylamide. The mixture was then cooled to room temperature, 50 cc. of water added and the mixture agitated until a homogeneous solution of dope containing 10% by weight of the copolymer resulted.

30.7 g. (3.07 g. of copolymer) of the above-prepared solution or dope of the copolymer were placed in a jacketed reactor provided with an agitator and heat exchanger. There were then added 10 g. of acrylonitrile, 114 cc. of water, 0.58 g. of 85% phosphoric acid, 0.1 g. of potassium persulfate, 0.17 g. of potassium metabisulfite, 0.1 g. of tertiary dodecyl mercaptan and 0.56 g. of a 30% solution in water of N-methyl methacrylamide and the mixture heated, with stirring, to 35° C. and then allowed to level off at 37°–39° C. After the heat of polymerization had been removed and when the conversion of the acrylonitrile to polymer had reached 96% or more, which is usually accomplished in a period of about 12 hours, the temperature was raised to 90° C. The mother liquor was removed by centrifuging the polymerization mixture, the polymer precipitate being reslurried twice with water and centrifuged to a 70% moisture cake. The cake was dried under vacuum at 80° C. in an agitated dryer. The over-all yield of modified polyacrylonitrile product was over 90%. After hammermilling, the dry powder, now ready for spinning, was stored in a moisture proof container.

The acrylonitrile graft polymer prepared as above and containing about 18% by weight of N-methyl methacrylamide was soluble in N,N-dimethylformamide. Fibers spun by extruding a solution of the polymer product in N,N-dimethylformamide into a precipitating bath had a softening temperature of about 240° C., an extensibility of about 20–30 percent depending on the drafting and relaxing conditions, and showed excellent affinity for dyes.

*Preparation of sulfone polyester polymer*

One hundred g. p,p′-sulfonyldibenzoic acid ethyl ester and 40 g. 1,5-pentanediol were placed in a reaction vessel equipped with a stirrer, a short distillation column, and an inlet tube for purified nitrogen. Five cc. of ethanol containing 0.4 g. Ti(OC$_2$H$_5$)$_4$ was added and the mixture was heated at 180–200° C. with stirring. After 1 hour, the distillation of ethyl alcohol ceased, and the temperature was raised to 280–285° C. where it was held for 20 minutes. A vacuum of 0.5 to 1.0 mm. was applied for 1 hour while the temperature was maintained at 280–285° C. A colorless product having an inherent viscosity of 0.80–0.90 in 60% phenol-40% tetrachlorethane solution was obtained. Fibers pulled from the melt and cold-drawn 400–500% show a sticking temperature of 240–250° C. The product is also useful for films and sheets.

The monoazo compounds of our invention can be applied to cellulose alkyl carboxylic acid esters having 2 to 4 carbon atoms in the acid groups thereof, nylon, acrylonitrile graft polymers, sulfone polyester and polyethylene terephthalate textile materials in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dye bath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dye bath, washed with an aqueous soap solution, rinsed well with water and dried.

In the case of certain of the acrylonitrile graft polymers described hereinbefore it is necessary to dye at the boil for an extended period of time. Instances may be encountered where the fiber is not satisfactorily colored by the dyeing procedure just described. In these instances special dyeing techniques, such as the use of pressure, for example, developed by the art for the coloration of materials difficult to color may be employed.

Widely varying amounts of dye can be used in the dyeing operation. The amount of dye used can be, for example, ⅓ to 3% (by weight) of that of the textile material although lesser or greater amounts of the dye can be employed.

The following example illustrates one satisfactory way in which the fibers of the acrylonitrile graft polymers can be dyed using the azo compounds of our invention. 16 milligrams of dye are ground with an aqueous solution of sodium lignin sulfonate until well dispersed or alternately the dye can be dissolved in 5 cc. of hot Cellosolve. The dispersion or solution, as the case may be, is then poured into 150 cc. of water to which a small amount of a surface-active agent such as Igepon T ($C_{17}H_{33}$·CO.N($CH_3$).$C_2H_4SO_3Na$) Nekal BX (sodium alkylnaphthalene-sulfonate) or Orvus (sodium lauryl sulfate-type) has been added. The dye bath is then brought to the desired temperature and 5 grams of well wet-out fibers of the graft polymer are added thereto. Dyeing is continued until the proper shade is reached. From time to time throughout the dyeing operation, the material is worked to promote even dyeing.

Acrylonitrile graft polymers including those of the type specifically described hereinbefore are described and claimed in Coover U. S. application Serial No. 408,012, filed February 3, 1954.

We claim:
1. The azo compounds having the formula:

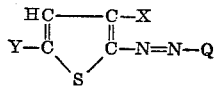

wherein X represents a member selected from the group consisting of a nitro group and an alkylsulfonyl group having 1 to 4, inclusive, carbon atoms, Y represents a member selected from the group consisting of an alkylsulfonyl group having 1 to 4, inclusive, carbon atoms and a sulfonealkylamido group having 1 to 4, inclusive, carbon atoms and Q represents a member selected from the group consisting of the radical of a 5-pyrazolone compound joined to the azo bond shown through the carbon atom in its 4-position, the radical of barbituric acid, the radical of 2-iminobarbituric acid, the radical of 4-iminobarbituric acid, the radical of 2-imino-3-cyanobarbituric acid, the radical of thiobarbituric acid and the radical of 4-iminothiobarbituric acid.

2. The azo compounds of claim 1 wherein Q represents the radical of a 5-pyrazolone compound joined to the azo bond shown through the carbon atom in its 4-position.

3. The azo compounds of claim 1 wherein Q represents the radical of barbituric acid.

4. The azo compounds of claim 1 wherein Q represents the radical of 2-iminobarbituric acid.

5. The azo compounds of claim 1 wherein Q represents the radical of thiobarbituric acid.

6. The azo compounds of claim 1 wherein Q represents the radical of 4-iminothiobarbituric acid.

7. The azo compounds having the formula:

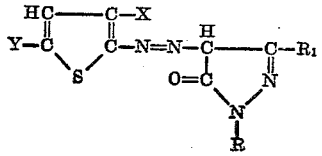

wherein X represents a member selected from the group consisting of a nitro group and an alkylsulfonyl group having 1 to 4, inclusive, carbon atoms, Y represents a member selected from the group consisting of an alkylsulfonyl group having 1 to 4, inclusive, carbon atoms and a sulfonealkylamido group having 1 to 4, inclusive, carbon atoms, R represents a member selected from the group consisting of a hydrogen atom and a phenyl radical and $R_1$ represents a member selected from the group consisting of a methyl group, a carboxyl group, a carbomethoxy group, a carboethoxy group, a phenyl group and a trifluoromethyl group.

8. The azo compound having the formula:

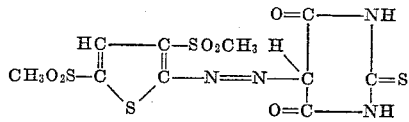

9. The azo compound having the formula:

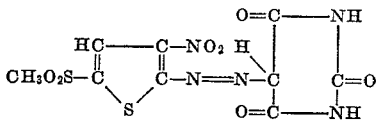

10. The azo compound having the formula:

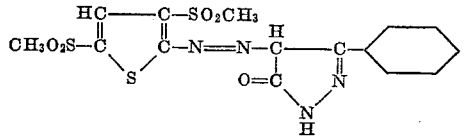

11. The azo compound having the formula:

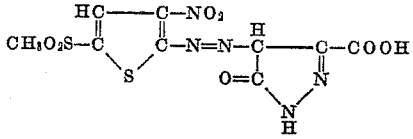

12. The azo compound having the formula:

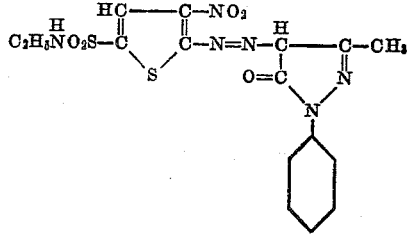

References Cited in the file of this patent
UNITED STATES PATENTS 2,313,738    Dickey et al.           Mar. 16, 1943
2,323,315    Dickey et al.           July 6, 1943

OTHER REFERENCES

Hartough: Thiophene and Its Derivatives, 1952, page 235.